United States Patent
Zheng et al.

(10) Patent No.: US 10,934,391 B2
(45) Date of Patent: Mar. 2, 2021

(54) POLYESTER COMPOSITION AND PREPARATION METHOD THEREFOR

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Cui Zheng, Beijing (CN); Guixiang Zhu, Beijing (CN); Lizhi Liu, Beijing (CN); Wei Zhang, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 40 days.

(21) Appl. No.: 16/343,332

(22) PCT Filed: Oct. 20, 2017

(86) PCT No.: PCT/CN2017/107111
§ 371 (c)(1),
(2) Date: Apr. 18, 2019

(87) PCT Pub. No.: WO2018/072748
PCT Pub. Date: Apr. 26, 2018

(65) Prior Publication Data
US 2019/0256649 A1 Aug. 22, 2019

(30) Foreign Application Priority Data

Oct. 21, 2016 (CN) .......................... 201610921310.6

(51) Int. Cl.
| | | |
|---|---|---|
| *C08G 63/183* | (2006.01) | |
| *C08J 3/12* | (2006.01) | |
| *C08K 3/04* | (2006.01) | |
| *C08K 3/26* | (2006.01) | |
| *C08K 3/32* | (2006.01) | |
| *C08K 3/34* | (2006.01) | |
| *C08K 5/00* | (2006.01) | |
| *C08K 5/20* | (2006.01) | |
| *C08L 67/02* | (2006.01) | |
| *C08L 23/06* | (2006.01) | |
| *C08L 45/00* | (2006.01) | |
| *C08L 77/00* | (2006.01) | |

(52) U.S. Cl.
CPC .............. *C08G 63/183* (2013.01); *C08J 3/12* (2013.01); *C08K 3/04* (2013.01); *C08K 3/26* (2013.01); *C08K 3/32* (2013.01); *C08K 3/346* (2013.01); *C08K 5/0083* (2013.01); *C08K 5/20* (2013.01); *C08L 67/02* (2013.01); *C08J 2367/02* (2013.01); *C08K 2003/321* (2013.01); *C08L 23/06* (2013.01); *C08L 45/00* (2013.01); *C08L 77/00* (2013.01); *C08L 2205/02* (2013.01); *C08L 2205/24* (2013.01)

(58) Field of Classification Search
USPC ......................................... 528/271, 272, 279
See application file for complete search history.

(56) References Cited

U.S. PATENT DOCUMENTS

| 7,332,562 B2 | 2/2008 | Chen et al. |
| 2012/0322908 A1 | 12/2012 | Bastioli |
| 2012/0329924 A1 | 12/2012 | Zhu et al. |
| 2013/0281560 A1 | 10/2013 | Bastioli et al. |
| 2015/0307671 A1 | 10/2015 | Yang et al. |

FOREIGN PATENT DOCUMENTS

| CA | 2948422 A1 | 11/2015 |
| CN | 101098932 A | 1/2008 |
| CN | 100429256 C | 10/2008 |
| CN | 101475695 A | 7/2009 |
| CN | 101525425 A | 9/2009 |
| CN | 102408688 A | 4/2012 |
| CN | 102695748 A | 9/2012 |
| CN | 102838856 A | 12/2012 |
| CN | 102898794 A | 1/2013 |
| CN | 103703049 A | 4/2014 |
| CN | 103788599 A | 5/2014 |
| CN | 103910858 A | 7/2014 |

(Continued)

OTHER PUBLICATIONS

Jiang, Long et al., "Study of Biodegradable Polylactide/Poly(butylene adipate-co-terephthalate) Blends"; American Chemical Society; Biomacromolecules, 2006, vol. 7, No. 1, pp. 199-207, published online Nov. 23, 2005, published in issue Jan. 1, 2006.

(Continued)

*Primary Examiner* — Terressa Boykin
(74) *Attorney, Agent, or Firm* — Novick, Kim & Lee, PLLC; Allen Xue

(57) ABSTRACT

A polyester composition, includes an aliphatic polyester and an aliphatic-aromatic copolyester. The aliphatic-aromatic copolyester is a copolymer having a repeating unit A and a repeating unit B. The preparation method for the polyester composition includes the steps of mixing all the components having the aliphatic polyester and the aliphatic-aromatic copolyester, and subjecting the resulting mixture to extrusion granulation.

19 Claims, No Drawings

(56) References Cited

FOREIGN PATENT DOCUMENTS

| | | | |
|---|---|---|---|
| CN | 104072952 | A | 10/2014 |
| CN | 104072953 | A | 10/2014 |
| CN | 104419125 | A | 3/2015 |
| CN | 104693759 | A | 6/2015 |
| CN | 105086387 | A | 11/2015 |
| CN | 104039865 | B | 3/2016 |
| JP | 2014156540 | A | 8/2014 |

OTHER PUBLICATIONS

Japanese Patent Office, Office Action for JP Application No. 2019-520776, dated Jan. 6, 2021.

POLYESTER COMPOSITION AND PREPARATION METHOD THEREFOR

TECHNICAL FIELD

The present invention relates to the field of polymer, specifically to a polyester composition and a process for the preparation of the polyester composition, as well as a toughened composite material prepared from the polyester composition.

BACKGROUND ART

Polybutylene terephthalate (PBT) is one of the five major engineering plastics. It was first synthesized by German scientist P. Schlack in 1942 and then industrially developed by the US company Celanese (now Ticona) and marketed under the trade name Celanex. PBT has the characteristics of good dimensional stability, high-temperature resistance, excellent flame retardant and insulation properties, good fluidity, small linear thermal expansion coefficient, good chemical solvent resistance, etc. It has a wide range of applications in the fields of electrical and electronic industry, automotive industry and office machinery. However, PBT is very poor in terms of impact resistance, especially very sensitive to defects. A tiny notch on the surface of an article may cause the whole article to be fractured. Therefore, it is quite necessary to modify PBT by toughening.

The toughening modification of PBT is mainly modification by blending, which in turn is mainly divided into three categories. The first category is toughening with fibers, wherein mainly glass fibers are added to PBT, and other fibers such as carbon fibers, bamboo fibers or flax fibers may also be added. For example, in CN105086387A, glass fibers are added to the PBT in about half of the amount thereof, which can significantly increase the notched impact strength thereof. The main disadvantage of adding fibers is that the material can no longer be processed using a conventional injection molding process, but often additional matching process cost is required, especially for long fibers that significantly improve the properties, the process cost is significant. The second category is addition of high impact materials. Due to the relatively high processing temperature of PBT, it is often necessary to add materials that can withstand relatively high processing temperatures. A very common example is addition of PC (polycarbonate). For example, in CN104693759A, after about 100%-200% of PC based on the amount of PBT is added to PBT, the toughness is improved. The disadvantage of adding high impact materials is that almost all the current high impact materials are incompatible with PBT, they repel each other at the molecular level, and they are difficult to be completely mixed uniformly even after very strong blending conditions. Adding a large amount of a compatibilizer can partially solve this problem, but at the same time it will bring about a decline in material properties. The third category is the addition of other materials that are very similar to the PBT molecular structure but tougher than PBT to slightly improve the toughness of PBT. A typical example is PET (polyethylene terephthalate). For example, in CN104419125A, PBT and PET are blended in about equal amounts, the material obtained has stronger toughness than PBT. The disadvantage of this category is that even if the material similar to PBT in molecular structure has a better toughness than PBT, it is not better by a large margin, and the final result is that the toughness of the obtained composite material is not significantly improved.

Another effective method for the toughening modification of PBT is to subject it to copolymerization modification. However, although there are many copolymers containing PBT structure at present, for example, the product under the tradename ecoflex of the US company BASF (but its engineering plastic performance is far worse than PBT, in fact, it is used as a flexible material), due to various reasons, such as material properties and cost control, there is yet no actual copolymerization modified product for toughening of PBT on the market. Therefore, at present, there is an urgent need to find a PBT product modified in terms of toughness.

DISCLOSURE

Summary of the Invention

It is an object of the present invention to provide a polyester composition and a process for its preparation, as well as a toughened composite material prepared from the polyester composition, so as to overcome the above defects of the existing PBT products. Compared with PBT, the toughness of the polyester composition and the composite material of the present invention should be significantly improved.

Another object of the present invention is to provide an improved polyester composition, during the preparation of which it is unnecessary to additionally add a compatibilizer.

Another object of the present invention is to provide an improved polyester composition which should be processable using the same equipment as that for PBT, without the need for additional modifications to the processing equipment during its preparation.

According to the present invention, the above objects are achieved by a polyester composition comprising an aliphatic polyester and an aliphatic-aromatic copolyester.

Thus, the present invention provides a polyester composition, comprising an aliphatic polyester and an aliphatic-aromatic copolyester, characterized in that the aliphatic-aromatic copolyester is a copolymer comprising a repeating unit A represented by formula (I) and a repeating unit B represented by formula (II),

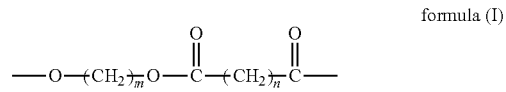

formula (I)

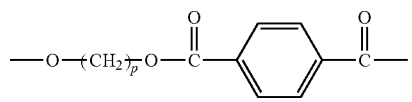

formula (II)

wherein based on the total moles of the repeating unit A and the repeating unit B in the aliphatic-aromatic copolyester, the content of the repeating unit A is from 1 to 60 mol %, preferably from 20 to 40 mol %, and the content of the repeating unit B is from 40 to 99 mol %, preferably from 60 to 80 mol %; m is an integer of 2 to 10, n is an integer of 2 to 8, p is an integer of 2 to 10, preferably, m is an integer of 2 to 6, n is an integer of 2 to 4, p is an integer of 2 to 6; and m, n and p are the same or different.

Preferably, the aliphatic-aromatic copolyester is a copolymer comprising the repeating unit A represented by formula (I') and the repeating unit B represented by formula (II-1),

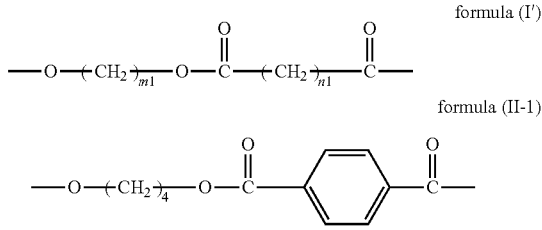

formula (I')

formula (II-1)

wherein based on the total moles of the repeating unit A and the repeating unit B in the aliphatic-aromatic copolyester, the content of the repeating unit A is from 1 to 60 mol %, and the content of the repeating unit B is from 40 to 99 mol %; m1 is an integer of 2 to 10, n1 is an integer of 2 to 8, and m1 and n1 are the same or different. More preferably, based on the total moles of the repeating unit A and the repeating unit B in the aliphatic-aromatic copolyester, the content of the repeating unit A is from 20 to 40 mol %, and the content of the repeating unit B is from 60 to 80 mol %; m1 is an integer of 2 to 6, n1 is an integer of 2 to 4, and m1 and n1 are the same or different.

According to the present invention, the aliphatic-aromatic copolyester may have a weight average molecular weight of 50,000 to 900,000, more preferably 100,000 to 500,000, as measured by GPC; preferably, the molecular weight distribution is 1.2 to 3, as measured by GPC.

The aliphatic-aromatic copolyester may be at least one selected from the group consisting of a random copolymer, an alternating copolymer, a block copolymer, and a graft copolymer.

In the polyester composition according to the present invention, based on the total weight of the aliphatic polyester and the aliphatic-aromatic copolyester, the content of the aliphatic polyester may be from 1 to 50% by weight, and the content of the aliphatic-aromatic copolyester may be from 50 to 99% by weight; preferably, the content of the aliphatic polyester may be from 5 to 30% by weight, and the content of the aliphatic-aromatic copolyester may be from 70 to 95% by weight.

According to the present invention, the aliphatic polyester preferably comprises a repeating unit C represented by formula (I"),

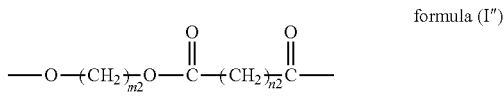

formula (I")

wherein m2 is an integer of 2 to 10, n2 is an integer of 2 to 8, and m2 and n2 are the same or different;
preferably, m2 is an integer of 2 to 6, n2 is an integer of 2 to 4, and m2 and n2 are the same or different.

The aliphatic polyester may have a weight average molecular weight of 50,000 to 900,000, preferably 100,000 to 500,000, as measured by GPC.

The polyester composition according to the present invention may further comprise a nucleating agent; the content of the nucleating agent is from 0.01 to 10% by weight, preferably from 0.2 to 5% by weight, based on the total weight of the polyester composition.

For example, the nucleating agent may be one or more selected from the group consisting of talc, calcium oxide, carbon black, calcium carbonate, inorganic pigments, kaolin, metal carboxylates, metal phosphates, dibenzyl sorbitol and derivatives thereof, polyvinylcyclohexane, polyvinylcyclopentane, low density polyethylene, hyperbranched polyamide and ethylene-methacrylic acid ionomer; preferably one or more selected from the group consisting of calcium carbonate, low density polyethylene, dibenzyl sorbitol and derivatives thereof and hyperbranched polyamides.

The polyester composition according to the present invention may further comprise other additives such as erucylamide and/or white oil.

The polyester composition according to the present invention has an elongation at break preferably as high as 680% or above, as measured by the method according to the standard GB/T 1040.2-2006.

In another aspect, the present invention further provides a process for the preparation of a polyester composition according to the present invention, characterized in that the process comprises: mixing all the components including an aliphatic polyester and an aliphatic-aromatic copolyester, and subjecting the resulting mixture to extrusion pelletization to obtain the polyester composition.

The mixing may be carried out under stirring; and the stirring rate may be 6 to 60 rpm, and the stirring time may be 2 to 30 min. Advantageously, said extrusion pelletization is carried out in a twin-screw extruder; preferably, said extrusion pelletization conditions include: a temperature of 120 to 270° C., a screw rotational speed of 10 to 70 rpm, and a torque of 2 to 80 N*m.

Preferably, no compatibilizer is added during the mixing process.

Furthermore, the present invention further provides a toughened composite material prepared from the polyester composition according to the present invention The present invention achieves the object of toughening modification of PBT by copolymerizing and blending modification of PBT. Compared with PBT, the polyester composition provided by the present invention has significantly increased toughness; further, in the preparation of the polyester composition, it is unnecessary to additionally add a compatibilizer. In addition, the polyester composition provided by the present invention can be processed using the same equipment as that for PBT, without the need for additional modifications to the processing equipment during its preparation. Therefore, the polyester composition provided by the present invention has good industrial application prospects.

Other characters and advantages of the present invention will be described in detail under Detailed Description of the Invention below.

DETAILED DESCRIPTION OF THE INVENTION

The present invention provides a polyester composition, comprising an aliphatic polyester and an aliphatic-aromatic copolyester, characterized in that the aliphatic-aromatic copolyester is a copolymer comprising a repeating unit A represented by formula (I) and a repeating unit B represented by formula (II),

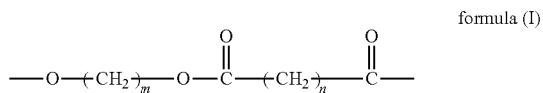

formula (I)

-continued

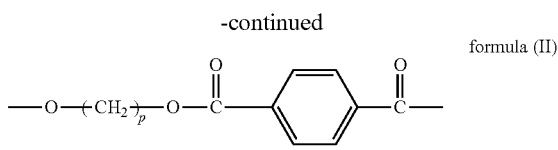

formula (II)

wherein based on the total moles of the repeating unit A and the repeating unit B in the aliphatic-aromatic copolyester, the content of the repeating unit A is from 1 to 60 mol %, preferably from 20 to 40 mol %, and the content of the repeating unit B is from 40 to 99 mol %, preferably from 60 to 80 mol %; m is an integer of 2 to 10, n is an integer of 2 to 8, p is an integer of 2 to 10, preferably, m is an integer of 2 to 6, n is an integer of 2 to 4, p is an integer of 2 to 6; and m, n and p are the same or different.

In a preferred embodiment, the aliphatic-aromatic copolyester is a copolymer comprising the repeating unit A represented by formula (I') and the repeating unit B represented by formula (II-1),

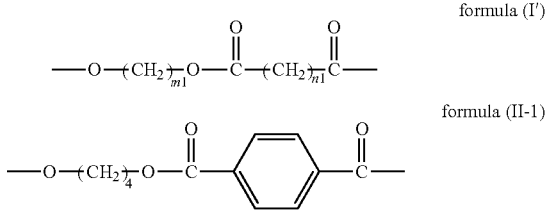

formula (I')

formula (II-1)

wherein based on the total moles of the repeating unit A and the repeating unit B in the aliphatic-aromatic copolyester, the content of the repeating unit A is from 1 to 60 mol %, and the content of the repeating unit B is from 40 to 99 mol %; m1 is an integer of 2 to 10, n1 is an integer of 2 to 8, and m1 and n1 are the same or different, the aliphatic-aromatic copolyester has a weight average molecular weight of 50,000 to 900,000.

Preferably, based on the total moles of the repeating unit A and the repeating unit B in the aliphatic-aromatic copolyester, the content of the repeating unit A is from 20 to 40 mol %, and the content of the repeating unit B is from 60 to 80 mol %; m1 is an integer of 2 to 6, n1 is an integer of 2 to 4, and m1 and n1 are the same or different, the aliphatic-aromatic copolyester has a weight average molecular weight of 100,000 to 500,000.

In the present invention, the weight average molecular weight of the polymer is measured by gel permeation chromatography (GPC).

In the present invention, the aliphatic-aromatic copolyester may be at least one selected from the group consisting of a random copolymer, an alternating copolymer, a block copolymer and a graft copolymer, preferably, a random copolymer and/or a block copolymer. The source of the aliphatic-aromatic copolyester of the present invention is not particularly limited. It can be obtained by a conventional means in the art, for example, it can be obtained commercially, or it can be prepared by the process disclosed in CN100429256C.

Specifically, the process for preparing the aliphatic-aromatic copolyester may comprise the following steps:
(1) reacting monomer A with monomer B in the presence of a first catalyst in an inert atmosphere;
(2) reacting monomer C with monomer D in the presence of the first catalyst in an inert atmosphere;
(3) reacting the reaction product obtained in step (1) with the reaction product obtained in step (2) in the presence of a second catalyst;

wherein the monomer A is butanediol; the monomer B is terephthalic acid and/or an ester thereof, preferably, at least one selected from the group consisting of terephthalic acid, dimethyl terephthalate and diethyl terephthalate; the monomer C is a C2-C4 diol (particularly a saturated linear diol); the monomer D is a C4-C6 dibasic acid (particularly a saturated linear dibasic acid); the first catalyst is at least one selected from the group consisting of tetrabutyl titanate, titanium dioxide, diethoxy titanium and zinc acetate, preferably tetrabutyl titanate; the second catalyst is at least one selected from the group consisting of lanthanum acetylacetonate, lanthanum trichloride, triphenoxy lanthanum and lanthanum propionate, preferably lanthanum acetylacetonate.

In the present invention, in step (1), the molar ratio of the monomer B to the first catalyst is 1:0.0001-0.02:0.0001-0.02, more preferably 1:0.001-0.003:0.001-0.003.

In the present invention, in step (2), the molar ratio of the monomer D to the first catalyst is 1:0.0001-0.02:0.0001-0.02, more preferably 1:0.001-0.003:0.001-0.003.

Preferably, the molar ratio of the total amount of the first catalyst (the sum of the amount of the first catalyst in step (1) and the amount of the first catalyst in step (2)) to the amount of the second catalyst is 1:0.5-1.5, preferably 1:0.8-1.2.

In the present invention, the kinds of the various reactive monomers can be adjusted correspondingly according to the composition and molecular weight of the target product, and the molecular weight of the product and the content of each repeating unit in the product are respectively controlled by adjusting the feeding amount and the feeding ratio.

In the present invention, in step (1), the temperature of the reaction is preferably 160 to 220° C.; in the present invention, in step (2), the temperature of the reaction is preferably 160 to 220° C.; in the present invention, in step (3), the temperature of the reaction is preferably 180 to 240° C.

In a preferred embodiment of the present invention, when m1 is 4, the process for preparing the aliphatic-aromatic copolyester comprises the following steps:
(S1) reacting butanediol with monomer A' in the presence of a first catalyst in an inert atmosphere;
(S2) reacting the reaction product obtained in step (S1) with monomer B' in the presence of a second catalyst;
wherein A' is terephthalic acid and/or an ester thereof, preferably at least one selected from the group consisting of terephthalic acid, dimethyl terephthalate and diethyl terephthalate; the monomer B' is a C4-C6 dibasic acid (particularly a saturated linear dibasic acid); the first catalyst and the second catalyst are described as above and will not be further described herein.

In the present invention, in step (S1), the molar ratio of the monomer A' to the first catalyst is 1:0.0001-0.02:0.0001-0.02, more preferably 1:0.001-0.003:0.001-0.003.

Preferably, the molar ratio of the amount of the first catalyst to the amount of the second catalyst is 1:0.5-1.5, preferably 1:0.8-1.2.

In the present invention, the kinds of the various reactive monomers can be adjusted correspondingly according to the composition and molecular weight of the target product, and the molecular weight of the product and the content of each repeating unit in the product are respectively controlled by adjusting the feeding amount and the feeding ratio.

In the present invention, in step (S1), the temperature of the reaction is preferably 160 to 220° C.; in the present invention, in step (S2), the temperature of the reaction is preferably 180 to 240° C.

More specifically, the process for producing the aliphatic-aromatic copolyester may comprise the following steps: adding 1,4-butanediol, dimethyl benzoate and the catalyst as described in U.S. Ser. No. 11/312,373 to a reactor; heating and stirring under a nitrogen atmosphere until a clear solution is obtained; subsequently, increasing the temperature to 160 to 220° C. for reaction; adding succinic acid after most of the distilled methanol in the system is removed, and increasing the temperature to 180 to 240° C.; removing most of the water by distillation, then slowly creating a vacuum environment, and increasing the temperature of the system to 220 to 280° C.; after 3 to 6 hours, completing the reaction to obtain a product.

According to the present invention, based on the total weight of the aliphatic polyester and the aliphatic-aromatic copolyester, the content of the aliphatic polyester may be from 1 to 50% by weight, and the content of the aliphatic-aromatic copolyester may be from 50 to 99% by weight; preferably, the content of the aliphatic polyester is from 5 to 30% by weight, and the content of the aliphatic-aromatic copolyester is from 70 to 95% by weight; more preferably, the content of the aliphatic polyester is from 10 to 20% by weight, and the content of the aliphatic-aromatic copolyester is from 80 to 90% by weight.

In the present invention, the inventors have unexpectedly found during the research that blending the copolymer of PBT with a conventional aliphatic polyester can significantly increase the toughness of the product; and, the aliphatic polyester and the copolymer of PBT used in the present invention have good compatibility; the purpose of toughening modification of the PBT material can be achieved under conventional blending conditions without the need of additionally adding a compatibilizer. Thus, the aliphatic polyester in the present invention is not particularly limited in terms of its kind, and it can be an aliphatic polyester conventionally used in the art.

Preferably, the aliphatic polyester comprises a repeating unit C represented by formula (I″),

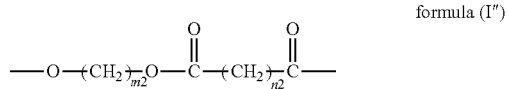

formula (I″)

wherein m2 is an integer of 2 to 10, n2 is an integer of 2 to 8, and m2 and n2 are the same or different, the aliphatic polyester has a weight average molecular weight of 50,000 to 900,000; more preferably, m2 is an integer of 2 to 6, n2 is an integer of 2 to 4, and m2 and n2 are the same or different, the aliphatic polyester has a weight average molecular weight of 100,000 to 500,000.

In the present invention, the aliphatic polyester can be obtained by a conventional means, for example, it can be obtained commercially (for example, available from the company BASF, under the designation 1111HTA4), or it can be prepared by the method according to the standard disclosed in CN104039865B, wherein the kinds of the starting materials for reaction can be correspondingly adjusted according to the composition and molecular weight of the target product, and the molecular weight of the product and the content of each repeating unit in the product were respectively controlled by adjusting the feeding amount and the feeding ratio.

According to the present invention, the polyester composition may further comprise a nucleating agent; the content of the nucleating agent may be 0.01 to 10% by weight, preferably 0.2 to 5% by weight, more preferably 1 to 5% by weight, based on the total weight of the polyester composition.

According to the present invention, the nucleating agent may be a conventional selection in the art. For example, the nucleating agent may be one or more selected from the group consisting of talc, calcium oxide, carbon black, calcium carbonate, inorganic pigments (such as the yellow or green pigments purchased from Guangzhou Yingyi Plastic Pigment Co., Ltd.), kaolin, metal carboxylates, metal phosphates, dibenzyl sorbitol and derivatives thereof, polyvinylcyclohexane, polyvinylcyclopentane, low density polyethylene, hyperbranched polyamide and ethylene-methacrylic acid ionomer; preferably one or more selected from the group consisting of calcium carbonate, low density polyethylene, dibenzyl sorbitol and derivatives thereof, and hyperbranched polyamides; more preferably, calcium carbonate and/or low density polyethylene.

In the present invention, the polyester composition may further comprise other additives, such as erucylamide and/or white oil.

The present invention further provides a process for the preparation of a polyester composition according to the present invention, which comprises: mixing all the components including the aliphatic polyester and the aliphatic-aromatic copolyester, and subjecting the resulting mixture to extrusion pelletization to obtain the polyester composition.

According to the present invention, the mixing can be carried out under stirring; the stirring rate can be 6 to 60 rpm, and the stirring time can be 2 to 30 min.

According to the present invention, the extrusion pelletization process can be carried out according to a conventional extrusion pelletization method, for example, the extrusion pelletization can be carried out in a twin-screw extruder; preferably, the extrusion pelletization conditions include: a temperature of 120 to 270° C., a screw rotational speed of 10 to 70 rpm, and a torque of 2 to 80 N*m; more preferably, the twin-screw extruder includes six temperature sections, and from the feed inlet to the extrusion outlet, the temperatures of various sections are successively 190 to 240° C., 200 to 250° C., 210 to 260° C., 220 to 260° C., 220 to 265° C., 210 to 260° C.

In the present invention, the inventors have unexpectedly found during the research that blending the copolymer of PBT with a conventional aliphatic polyester can significantly increase the toughness of the product; and, the aliphatic polyester and the copolymer of PBT used in the present invention have good compatibility; the purpose of toughening modification of the PBT material can be achieved under conventional blending conditions without the need of additionally adding a compatibilizer. Thus, in the present invention, the mixing process may be carried out without adding a compatibilizer.

In the present invention, the compatibilizer may be a conventional selection in the art, and may be, for example, at least one selected from the group consisting of PE-g-ST, PP-g-ST, ABS-g-MAH, PE-g-MAH and PP-g-MAH.

Preferably, the polyester composition according to the present invention may have an elongation at break of up to 680% or above, and has significantly improved toughness.

A toughened composite material can be prepared from the polyester composition of the present invention by a conventional molding process. The toughened composite material according to the present invention may have an elongation at break of up to 680% or above, as measured by the method according to the standard GB/T 1040.2-2006.

EXAMPLES

The present invention will be described in detail below by way of examples. It shall be understood that the examples described herein are merely used to explain and illustrate the present invention and are not intended to limit the present invention.

In the following examples and comparative examples,
the weight average molecular weight of a polymer was measured by gel permeation chromatography (GPC) on Waters-208 (with a Waters 2410 RI detector, 1.5 mL/min flow rate, 30° C.) instrument, using tetrahydrofuran (THF) as the solvent, and calibrated with polystyrene standard;
the microstructure of the aliphatic polyester and the aliphatic-aromatic copolyester was determined by an AVANCE DRX 400 MHz NMR spectrometer from the company Bruker, Switzerland, using deuterated chloroform as the solvent;
the constitution of the polyester composition was determined by the feeding of the starting materials;
the mechanical properties of the polyester composition were tested by the method according to the standard GB/T 1040.2-2006, and the gauge dimension of 5B was chosen;
unless otherwise specified, the aliphatic-aromatic copolyester used in the present invention was self-made according to the process disclosed in Examples B13-B21 of CN100429256C, wherein the kinds of the starting materials for reaction can be correspondingly adjusted according to the composition and molecular weight of the target product, and the molecular weight of the product and the content of each repeating unit in the product can be respectively controlled by adjusting the feeding amount and the feeding ratio.

Example 1

20 g of polybutylene succinate (available from the company BASF, under the designation 1111HTA4, the same below), 180 g of butylene terephthalate-butylene succinate copolyester (weight average molecular weight of 100,000, wherein based on the total moles of the butylene succinate repeating unit and the butylene terephthalate repeating unit, the content of the butylene terephthalate repeating unit is 80 mol %) and 2 g of calcium carbonate were mixed under stirring, with the stirring rate of 10 rpm and for the time of 10 minutes. The resulting mixture was subjected to extrusion pelletization via a twin-screw extruder, with the rotational speed of the screw being controlled at 10 rpm, the screw torque being 20 N*m, and from the feed inlet to the extrusion outlet the temperatures of various sections in the twin-screw extruder being successively 240° C., 250° C., 260° C., 260° C., 265° C., 260° C., to prepare polyester composition A1.

Comparative Example 1

A polyester composition was prepared according to the process of Example 1, except that the same weight of polybutylene terephthalate (available from the company DuPont, under the designation Crastin SC164 NC010) was used instead of the butylene terephthalate-butylene succinate copolyester used in Example 1, to obtain polyester composition D1.

Comparative Example 2

A polyester composition was prepared according to the process of Example 1, except that the polybutylene succinate used in Example 1 was not added, to obtain polyester composition D2.

Comparative Example 3

A polyester composition was prepared according to the process of Example 1, except that the same weight of the butylene terephthalate-butylene succinate copolyester (weight average molecular weight of 100,000, wherein based on the total moles of the butylene succinate repeating unit and the butylene terephthalate repeating unit, the content of the butylene terephthalate repeating unit is 25 mol %) was used, to obtain polyester composition D3.

Example 2

20 g of polybutylene succinate, 180 g of butylene terephthalate-butylene succinate copolyester (weight average molecular weight of 100,000, wherein based on the total moles of the butylene succinate repeating unit and the butylene terephthalate repeating unit, the content of the butylene terephthalate repeating unit is 60 mol %) and 2 g of calcium carbonate were mixed under stirring, with the stirring rate of 10 rpm and for the time of 10 minutes. The resulting mixture was subjected to extrusion pelletization via a twin-screw extruder, with the rotational speed of the screw being controlled at 10 rpm, the screw torque being 20 N*m, and from the feed inlet to the extrusion outlet the temperatures of various sections in the twin-screw extruder being successively 190° C., 200° C., 210° C., 220° C., 220° C., 210° C., to prepare polyester composition A2.

Example 3

20 g of polyhexylene succinate (prepared according to the method disclosed in CN104039865B, having a weight average molecular weight of 100,000), 180 g of butylene terephthalate-butylene succinate copolyester (weight average molecular weight of 100,000, wherein based on the total moles of the butylene succinate repeating unit and the butylene terephthalate repeating unit, the content of the butylene terephthalate repeating unit is 80 mol %) and 2 g of calcium carbonate were mixed under stirring, with the stirring rate of 10 rpm and for the time of 10 minutes. The resulting mixture was subjected to extrusion pelletization via a twin-screw extruder, with the rotational speed of the screw being controlled at 10 rpm, the screw torque being 20 N*m, and from the feed inlet to the extrusion outlet the temperatures of various sections in the twin-screw extruder being successively 240° C., 250° C., 260° C., 260° C., 265° C., 260° C., to prepare polyester composition A3.

Example 4

20 g of polybutylene succinate, 180 g of butylene terephthalate-butylene adipate copolyester (weight average molecular weight of 100,000, wherein based on the total moles of the butylene adipate repeating unit and the butylene terephthalate repeating unit, the content of the butylene terephthalate repeating unit is 60 mol %) and 2 g of calcium carbonate were mixed under stirring, with the stirring rate of 10 rpm and for the time of 10 minutes. The resulting mixture was subjected to extrusion pelletization via a twin-screw extruder, with the rotational speed of the screw being controlled at 10 rpm, the screw torque being 20 N*m, and from the feed inlet to the extrusion outlet the temperatures of various sections in the twin-screw extruder being successively 190° C., 200° C., 210° C., 220° C., 220° C., 210° C., to prepare polyester composition A4.

Example 5

40 g of polybutylene succinate, 160 g of butylene terephthalate-butylene succinate copolyester (weight average molecular weight of 100,000, wherein based on the total moles of the butylene succinate repeating unit and the butylene terephthalate repeating unit, the content of the butylene terephthalate repeating unit is 60 mol %) and 2 g of calcium carbonate were mixed under stirring, with the stirring rate of 10 rpm and for the time of 10 minutes. The resulting mixture was subjected to extrusion pelletization via a twin-screw extruder, with the rotational speed of the screw being controlled at 10 rpm, the screw torque being 20 N*m, and from the feed inlet to the extrusion outlet the temperatures of various sections in the twin-screw extruder being successively 190° C., 200° C., 210° C., 220° C., 220° C., 210° C., to prepare polyester composition A5.

Example 6

40 g of polybutylene succinate, 160 g of butylene terephthalate-butylene succinate copolyester (weight average molecular weight of 100,000, wherein based on the total moles of the butylene succinate repeating unit and the butylene terephthalate repeating unit, the content of the butylene terephthalate repeating unit is 60 mol %) and 10 g of calcium carbonate were mixed under stirring, with the stirring rate of 10 rpm and for the time of 10 minutes. The resulting mixture was subjected to extrusion pelletization via a twin-screw extruder, with the rotational speed of the screw being controlled at 10 rpm, the screw torque being 20 N*m, and from the feed inlet to the extrusion outlet the temperatures of various sections in the twin-screw extruder being successively 190° C., 200° C., 210° C., 220° C., 220° C., 210° C., to prepare polyester composition A6.

Example 7

40 g of polybutylene succinate, 160 g of butylene terephthalate-butylene succinate copolyester (weight average molecular weight of 100,000, wherein based on the total moles of the butylene succinate repeating unit and the butylene terephthalate repeating unit, the content of the butylene terephthalate repeating unit is 60 mol %) and 2 g of a low density polyethylene (available from SINOPEC Yanshan Petrochemical Company, under the designation LD607) were mixed under stirring, with the stirring rate of 10 rpm and for the time of 10 minutes. The resulting mixture was subjected to extrusion pelletization via a twin-screw extruder, with the rotational speed of the screw being controlled at 10 rpm, the screw torque being 20 N*m, and from the feed inlet to the extrusion outlet the temperatures of various sections in the twin-screw extruder being successively 190° C., 200° C., 210° C., 220° C., 220° C., 210° C., to prepare polyester composition A7.

Example 8

20 g of polybutylene succinate, 180 g of butylene terephthalate-butylene succinate copolyester (weight average molecular weight of 500,000, wherein based on the total moles of the butylene succinate repeating unit and the butylene terephthalate repeating unit, the content of the butylene terephthalate repeating unit is 80 mol %) and 2 g of calcium carbonate were mixed under stirring, with the stirring rate of 10 rpm and for the time of 10 minutes. The resulting mixture was subjected to extrusion pelletization via a twin-screw extruder, with the rotational speed of the screw being controlled at 10 rpm, the screw torque being 20 N*m, and from the feed inlet to the extrusion outlet the temperatures of various sections in the twin-screw extruder being successively 240° C., 250° C., 260° C., 260° C., 265° C., 260° C., to prepare polyester composition A8.

Example 9

A polyester composition was prepared according to the process of Example 1, except that the calcium carbonate used in Example 1 was not added, to obtain polyester composition A9.

Test Examples

The polyester compositions prepared in Examples 1-9 and Comparative examples 1-3 were made into specimens, respectively, which were subjected to mechanical property tests such as tensile yield strength (MPa) and elongation at break (%). The results are shown in Table 1 below.

TABLE 1

| | Specimen material | Tensile yield strength (MPa) | Elongation at break (%) |
|---|---|---|---|
| Test example 1 | A1 | 26 | 720 |
| Test example 2 | D1 | 58 | 8 |
| Test example 3 | D2 | 25 | 160 |
| Test example 4 | D3 | 5 | 1500 |
| Test example 5 | A2 | 18 | 1200 |
| Test example 6 | A3 | 22 | 680 |
| Test example 7 | A4 | 14 | 1400 |
| Test example 8 | A5 | 13 | 1200 |
| Test example 9 | A6 | 17 | 1100 |
| Test example 10 | A7 | 16 | 1300 |
| Test example 11 | A8 | 24 | 1200 |
| Test example 12 | A9 | 24 | 730 |

It can be seen from the comparison of the results of the mechanical property tests of the specimens made from the above polyester compositions, which are prepared in Examples 1 to 9 and Comparative examples 1 to 3, that the polyester compositions provided by the present invention have an elongation at break of up to 680% or above, and have significantly improved toughness. Moreover, it is unnecessary to additionally add a compatibilizer during the preparation of the polyester compositions. In addition, the polyester compositions provided by the present invention can be processed using the same equipment as that for PBT, without the need for additional modifications to the processing equipment during its preparation. Therefore, the polyester compositions provided by the invention have good industrial application prospects.

The endpoints of the ranges and any values disclosed herein are not limited to the precise ranges or values, and these ranges or values shall be understood as including values that are close to the ranges or values. For numerical ranges, a combination may be made between the endpoint values of the various ranges, between the endpoint values of the various ranges and the individual point values, and between the individual point values to obtain one or more new numerical ranges. These numerical ranges shall be considered as specifically disclosed herein.

The preferred embodiments of the present invention have been described in detail above, but the present invention is not limited to the specific details of the above embodiments. Within the scope of the technical concept of the present invention, various simple modifications can be made to the technical solutions of the present invention. These simple variants all fall within the protection scope of the present invention.

It shall be further noted that the various specific technical features described in the above specific embodiments may be combined in any suitable manner without contradiction. In order to avoid unnecessary repetition, the present invention will not further describe the various possible combinations.

In addition, the various different embodiments of the present invention may be combined randomly. As long as such a combination does not deviate from the idea of the present invention, it shall also be regarded as the disclosure of the present invention.

The invention claimed is:

1. A polyester composition, comprising an aliphatic polyester and an aliphatic-aromatic copolyester, wherein the aliphatic-aromatic copolyester is a copolymer comprising a repeating unit A represented by formula (I) and a repeating unit B represented by formula (II),

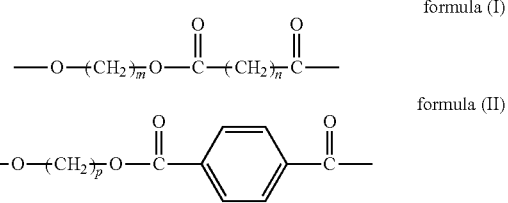

formula (I)

formula (II)

wherein, based on the total moles of the repeating unit A and the repeating unit B in the aliphatic-aromatic copolyester, the content of the repeating unit A is from 1 to 60 mol %, and the content of the repeating unit B is from 40 to 99 mol %; m is an integer of 2 to 10, n is an integer of 2 to 8, p is an integer of 2 to 10; and m, n and p are the same or different;

wherein the aliphatic polyester comprises a repeating unit C represented by formula (I″),

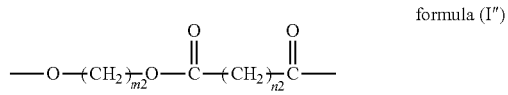

formula (I″)

wherein m2 is an integer of 2-10, n2 is an integer of 2-8, and m2 and n2 are the same or different.

2. The polyester composition according to claim 1, wherein the aliphatic-aromatic copolyester is a copolymer comprising the repeating unit A represented by formula (I') and the repeating unit B represented by formula (II-1),

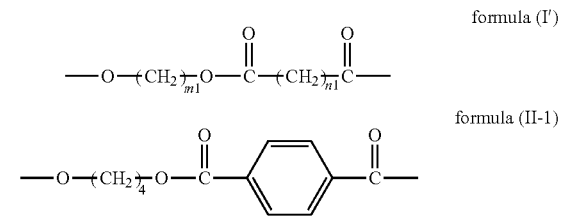

formula (I')

formula (II-1)

wherein, based on the total moles of the repeating unit A and the repeating unit B in the aliphatic-aromatic copolyester, the content of the repeating unit A is from 1 to 60 mol %, and the content of the repeating unit B is from 40 to 99 mol %; m1 is an integer of 2 to 10, n1 is an integer of 2 to 8, and m1 and n1 are the same or different.

3. The polyester composition according to claim 2, wherein, based on the total moles of the repeating unit A and the repeating unit B in the aliphatic-aromatic copolyester, the content of the repeating unit A is from 20 to 40 mol %, and the content of the repeating unit B is from 60 to 80 mol %; m1 is an integer of 2 to 6, n1 is an integer of 2 to 4, and m1 and n1 are the same or different.

4. The polyester composition according to claim 1, wherein the aliphatic-aromatic copolyester has a weight average molecular weight of 50,000 to 900,000, as measured by GPC; the molecular weight distribution is 1.2 to 3, as measured by GPC.

5. The polyester composition according to claim 1, wherein, based on the total weight of the aliphatic polyester and the aliphatic-aromatic copolyester, the content of the aliphatic polyester is from 1 to 50% by weight, and the content of the aliphatic-aromatic copolyester is from 50 to 99% by weight.

6. The polyester composition according to claim 1, wherein in formula (I″),

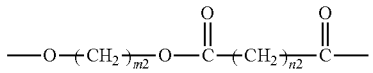

m2 is an integer of 2-6, n2 is an integer of 2-4, and m2 and n2 are the same or different.

7. The polyester composition according to claim 1, wherein the aliphatic polyester has a weight average molecular weight of 50,000 to 900,000, as measured by GPC.

8. The polyester composition according to claim 1, wherein the polyester composition further comprises a nucleating agent; the content of the nucleating agent is from 0.01 to 10% by weight, based on the total weight of the polyester composition.

9. The polyester composition according to claim 8, wherein the nucleating agent is one or more selected from talc, calcium oxide, carbon black, calcium carbonate, inorganic pigments, kaolin, metal carboxylates, metal phosphates, dibenzyl sorbitol and derivatives thereof, polyvinylcyclohexane, polyvinylcyclopentane, low density polyethylene, hyperbranched polyamide, and ethylene-methacrylic acid ionomer.

10. The polyester composition according to claim 1, wherein the polyester composition further comprises erucylamide and/or white oil.

11. The polyester composition according to claim 1, wherein aliphatic-aromatic copolyester is at least one selected from a random copolymer, an alternating copolymer, a block copolymer, and a graft copolymer.

12. The polyester composition according to claim 1, wherein the polyester composition has an elongation at break of up to 680% or above, as measured by the method according to the standard GB/T 1040.2-2006.

13. A process for the preparation of a polyester composition according to claim 1, comprising:
forming a mixture comprising the aliphatic polyester and the aliphatic-aromatic copolyester, and
subjecting the mixture to extrusion pelletization to obtain the polyester composition.

14. The process according to claim 13, wherein the mixture is formed under stirring with the stirring rate of 6 to 60 rpm and the stirring time of 2 to 30 min; said extrusion pelletization is carried out in a twin-screw extruder, at a temperature of 120 to 270° C., with a screw rotational speed of 10 to 70 rpm, and with a torque of 2 to 80 N*m.

15. The process according to claim 13, wherein the mixture contains no compatibilizer.

16. A toughened composite material, prepared from the polyester composition according to claim 1.

17. The polyester composition according to claim 1, wherein, based on the total moles of the repeating unit A and the repeating unit B in the aliphatic-aromatic copolyester, the content of the repeating unit A is from 20 to 40 mol %, and the content of the repeating unit B is from 60 to 80 mol %.

18. The polyester composition according to claim 1, wherein m is an integer of 2 to 6, n is an integer of 2 to 4, p is an integer of 2 to 6.

19. The polyester composition according to claim 5, wherein, based on the total weight of the aliphatic polyester and the aliphatic-aromatic copolyester, the content of the aliphatic polyester is from 5 to 30% by weight, and the content of the aliphatic-aromatic copolyester is from 70 to 95% by weight.

* * * * *